United States Patent
Burns et al.

(10) Patent No.: US 10,469,362 B1
(45) Date of Patent: Nov. 5, 2019

(54) NETWORK ROUTING UTILIZATION OF APPLICATION PROGRAMMING INTERFACES

(71) Applicant: Amazon Technologies, Inc., Seattle, WA (US)

(72) Inventors: Nathan Lee Burns, Mountain View, CA (US); Bin Wang, Fremont, CA (US); Pavan Kumar Surishetty, Seattle, WA (US); Jesen Kwok Ha, San Francisco, CA (US); Collin Charles Davis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 590 days.

(21) Appl. No.: 14/870,904

(22) Filed: Sep. 30, 2015

(51) Int. Cl.
*G06F 15/16* (2006.01)
*H04L 12/707* (2013.01)
*H04L 29/08* (2006.01)
*H04L 12/721* (2013.01)

(52) U.S. Cl.
CPC ............ *H04L 45/22* (2013.01); *H04L 45/123* (2013.01); *H04L 67/10* (2013.01)

(58) Field of Classification Search
CPC .............. H04L 29/06; H04L 29/12528; H04L 41/0253; H04L 41/5009; H04L 45/22; H04L 45/123; H04L 45/306; H04L 63/02; H04L 45/00; H04L 45/124; H04L 67/1093; H04L 29/12066; H04L 41/0803; H04L 45/44; H04L 67/32; H04L 67/1095; G06F 11/08; H04M 15/8044
See application file for complete search history.

(56) References Cited

U.S. PATENT DOCUMENTS

| | | | | |
|---|---|---|---|---|
| 5,719,942 A * | 2/1998 | Aldred | .................... | H04L 29/06 370/241 |
| 7,376,827 B1 * | 5/2008 | Jiao | .................... | H04L 29/12066 370/351 |
| 7,843,843 B1 * | 11/2010 | Papp, III | ............. | H04L 41/5009 370/252 |
| 8,040,808 B1 * | 10/2011 | Kasturi | .................. | H04L 45/00 370/238 |
| 8,094,575 B1 * | 1/2012 | Vadlakonda | .......... | H04L 45/123 370/252 |

(Continued)

*Primary Examiner* — Dustin Nguyen
(74) *Attorney, Agent, or Firm* — Knobbe, Martens, Olson & Bear, LLP

(57) ABSTRACT

Systems and methods are described for a routing service that identifies routes for providing a resource with the least cost for providing a resource configured for a data flow. The routing service can operate on various servers with varying functionalities in a distributed network topology. After establishing an application-programming interface ("API") session, the routing service can send API-based requests to the various servers to obtain API-based routing information. The routing service can use the routing information to determine that a network performance metric exceeds a threshold for providing a resource on a requested route. Advantageously, the routing service can determine alternative routes using the API routing information and, further, identify the least cost route of those alternative routes. Finally, the routing service can provide a resource configured for a data flow (e.g., a video conference) via the least cost route.

24 Claims, 7 Drawing Sheets

(56) References Cited

U.S. PATENT DOCUMENTS

| | | | | |
|---|---|---|---|---|
| 9,462,055 | B1* | 10/2016 | Herrin | H04L 67/1095 |
| 9,654,647 | B2* | 5/2017 | Nowack | H04M 15/8044 |
| 9,756,124 | B1* | 9/2017 | Bosch | H04L 67/1093 |
| 2003/0204619 | A1* | 10/2003 | Bays | H04L 41/0253 |
| | | | | 709/238 |
| 2010/0217874 | A1* | 8/2010 | Anantharaman | |
| | | | | H04L 29/12528 |
| | | | | 709/228 |
| 2011/0145842 | A1* | 6/2011 | Tofighbakhsh | H04L 45/306 |
| | | | | 719/328 |
| 2013/0185403 | A1* | 7/2013 | Vachharajani | H04L 45/44 |
| | | | | 709/221 |
| 2014/0259147 | A1* | 9/2014 | L'Heureux | H04L 63/02 |
| | | | | 726/14 |
| 2014/0269331 | A1* | 9/2014 | Pfeifer | H04L 45/124 |
| | | | | 370/238 |
| 2015/0244761 | A1* | 8/2015 | Tsyganok | G06F 11/08 |
| | | | | 709/219 |
| 2015/0271011 | A1* | 9/2015 | Neginhal | H04L 41/0803 |
| | | | | 370/254 |
| 2017/0026488 | A1* | 1/2017 | Hao | H04L 67/32 |
| 2017/0041213 | A1* | 2/2017 | Nadalin | H04L 45/22 |

* cited by examiner

NETWORK ROUTING UTILIZATION OF APPLICATION PROGRAMMING INTERFACES

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device ("client") and the server computing device can be referred to as a resource provider.

Resource providers are also generally motivated to provide requested resources to client computing devices often with consideration of efficient transmission of the requested resource to the client computing device or consideration of a latency associated with the transmission of the requested resource For larger scale implementations, a resource provider may receive resource requests from a high volume of client computing devices which can place a strain on the resource provider's computing resources. Additionally, the resource requested by the client computing devices may have a number of components, which can further place additional strain on the resource provider's computing resources.

Some resource providers attempt to facilitate the delivery of requested resource, such as Web pages or resources identified in Web pages, through various servers stored across a network (e.g., a regional network). For example, a content delivery network ("CDN") service provider may have regional servers or points-of-presence along a network edge that can facilitate providing the requested resource. A CDN service provider typically maintains a number of computing devices in a communication network that can maintain a wide variety of resources (e.g., multi-media content, files, etc.) from various content providers. In turn, content providers can instruct, or otherwise suggest to, client computing devices to request some, or all, of the content provider's resource from one of the CDN service provider's points of presence.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Figure 1:
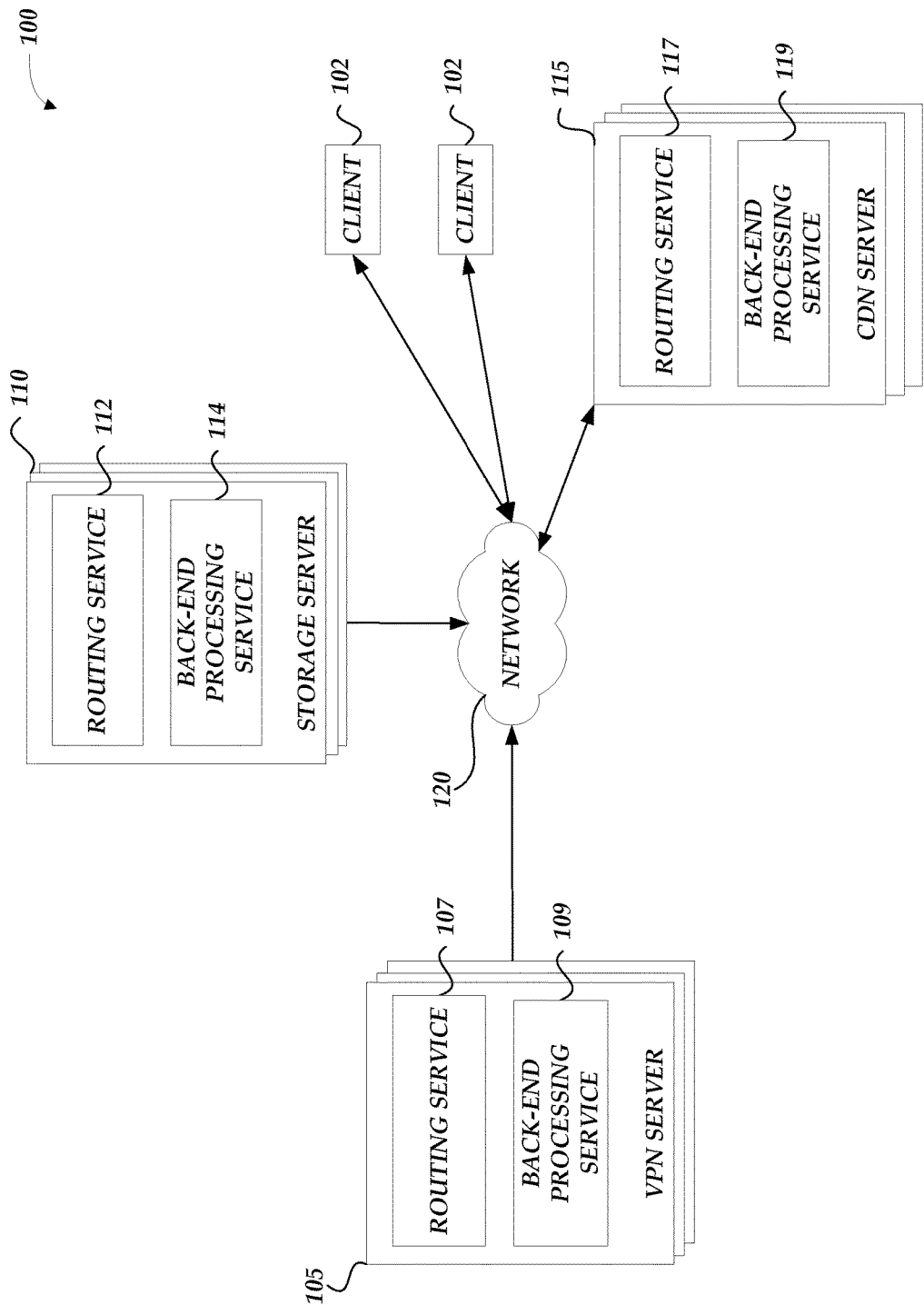
FIG. 1 is a block diagram depicting an illustrative network topology including a client computing device, a virtual private network (VPN) server, a storage server, a content delivery network (CDN) server interconnected via a network, with each server including a routing service and a back-end processing service.

Generally described, the present application relates to data communication routing. More specifically, aspects of the present application relate to routing network data communications utilizing a routing service. The routing service identifies routes for transmitting resource requests from client devices to target devices, such as a content provider or other source. Leveraging application level communications, data communications between multiple computing devices can utilize routing paths provided by the routing service.

By way of illustrative example, a client requests a resource from a server configured for a specific service functionality. The server can use the routing service, at an API level, to request a resource for that service functionality via the identified route. For example, if the routing service determines that an overload level or congestion level exists on at a particular route, the routing service identifies alternative routes to provide the requested resource. The routing service can further identify an alternative route to relay a requested resource through a plurality of servers configured with different service functionalities. The routing service communicates with such servers at the API level, where route requests can be made by a requesting server and routing information obtained from those servers with different functionalities. As used herein, a server configured for specific service functionality can be a server that hosts a service facilitating a particular functionality. For example, a storage service hosted on a storage server can uses storage volumes to produce storage processing results for some aspect of storage functionality. More specifically, a storage server can provision certain storage volumes for use by a customer of a data center.

In other aspects, the present disclosure relates to a routing service that analyzes API routing information to determine whether transient issues (e.g., a system overload) exists at a particular server. The routing service utilizes the API across a network topology (e.g., a regional network), with each server responding to the API level with API routing information. As but one example, the routing service utilizes API to instruct servers how to encapsulate API requests or API routing information at the API level in a communication protocol. With such API routing information available to the routing service, the routing service can operate at an API level on each server to identify routes in a distributed network topology. As used herein, API routing information may refer to routing information received or transmitted at an API-level, or may refer to API-based routing information.

As used herein, resources can include a resource capable of a data flow such as a high-definition video conference, a voice conference, or a remote viewing session such as via a Remote Desktop Protocol (RDP) session. For example, in one embodiment, a VPN server can transmit an API request regarding a RDP application to a client associated with a CDN server. The API request can include a destination IP address of the client associated with the CDN server and the port associated with RDP. In another embodiment, a resource capable of a data flow can be referred to as a real-time resource, for example, a real-time resource for real-time interactions.

With the routing service operating on each server, each server can be viewed or referred to as a network control point. Accordingly, each server, regardless of the service functionality hosted by a certain server, can identify routes within the network topology to provide requested resources for any service functionality hosted in the network topology. Operating in real time, servers can use the routing service to dynamically route traffic on identified routes with the lowest latency to achieve a higher throughput for various requested resources. Accordingly, for any particular requested resource, a lowest latency route can be identified by the routing service, which may operate on any network control point. Such network control points allow the routing service to leverage servers with varying functionalities, and in which such servers can operate a routing service at the API-level while still having the functionality to which the server is configured. For example, as described further below, a network control point may be a client computing device implementing the routing service, and operating as a server for routing data flows.

Further aspects of the disclosure will be described with regard to determining an appropriate route for providing a requested resource. In various embodiments, alternative routes are available to a requesting server for use in responding to a resource request from a client. With the API routing information, the routing service can analyze the routing information to characterize a congestion level or overload level along a requested route. For example, the routing service can characterize a congestion level for a regional network that services a particular VPN server that is indicative of a threshold level of network congestion that may impact the transmission of data communications. For example, the routing service can receive information via the API routing information that servers in that regional network, which would ordinarily provide the requested resource through particular route, may have increased latency in processing requests at the servers. Accordingly, the routing service can conclude, or otherwise receive an indication, that the congestion level of the regional network can be associated with an increased latency along that route. Utilizing the characterization information, the routing service can identify an alternative route that may use a plurality of alternative servers. In various embodiments, several alternative routes can be identified that may use alternative servers and/or servers within that regional network. After identification of an alternative route, the requesting server may provide a response to the resource request in accordance with the identified route.

In still other aspects, the routing service can utilize received API routing information to determine that an alternative route can be determined when a transient issue exists as indicated by a security concern within a regional network. The response to the resource request from a target device can be routed in accordance with an identified route, where the identified route may be logically outside of the regional network, thereby enhancing security. For example, a distributed denial-of-service (DDoS) attack in a regional network may cause a system overload as servers in that regional network are flooded with DDoS requests. With the system and methods described herein, the response to the resource request can be routed through a route on servers outside of that regional network. In addition, those servers may be configured for a different functionality than the requesting server. The response to the resource request can be routed at the API level via servers with different functionalities, thereby providing a requested resource in accordance with the identified route that is not a route substantially affected, in terms of latency or throughput, by the DDoS attack.

The foregoing aspects and many of the attendant advantages will become more readily appreciated as the same become better understood by reference to the following description of illustrative embodiments, when taken in conjunction with the accompanying drawings depicting the illustrative embodiments. The illustrative embodiments described below do not necessarily imply that any combination of features is required. Additionally, in some embodiments, the features of the illustrative embodiments can be combined.

FIG. 1 is a block diagram depicting an illustrative network topology including client computing devices 102, a virtual private network (VPN) server 105, a storage server 110, a content delivery network (CDN) server 115 interconnected via a network 120, with each server including a routing service 107, 112, 117 and a back-end processing service 109, 114, 119.

Client computing devices 102 may generally include any computing device transmitting or receiving resource requests through the network 120. While the term "client" is used in reference to client computing devices 102, client computing devices 102 should not be construed as limited to end user computing devices. Rather, client computing devices 102 may include end user devices, devices owned or operated by other service providers, or devices owned or operated by an administrator of (e.g., a data center operator) VPN server 105, storage server 110, or CDN server 115. Examples of client computing devices 102 include, but are not limited to, laptops, personal computers, tablet computers, personal digital assistants (PDAs), hybrid PDA/mobile phones, mobile phones, electronic book readers, digital media players, wearable computing devices, integrated components for inclusion in computing devices, appliances, electronic devices for inclusion in vehicles or machinery, gaming devices, set top boxes, electronic devices for inclusion in televisions, and the like.

The VPN server 105 can be a host for private enterprise network within network topology 100. For example, the VPN server 105 can have multiple client computing devices 102 associated only with that VPN server 105. The VPN server may manage the IP addresses of those client computing devices 102. For example, in one embodiment, the VPN server 105 can mask a private IP address of a particular client computing device 102, so that, to the network 120, only a public IP address appears for that particular client computing device 102, rather than the actual private IP address of that client computing device 102. In addition, using the methods and techniques described herein, the VPN server 105 can set up secure tunnels between the client computing device 102 of the private enterprise network and another network component in the network topology 100. For example, the VPN server 105 can set up a secure tunnel between a private client computing device 102 and a client of the storage server 110, for example, a client that provisions a storage volume associated with the storage server 110. The VPN server 105 can be configured as a network control point for private enterprise requests or for relaying resource requests from other servers in network topology 100 such as storage server 110 and the CDN server 115.

Storage server 110 can also host a storage network within network topology 100. Not depicted in FIG. 1, the network topology 100 can also include multiple host computing devices with multiple sets of client computing devices 102 that communicate with the virtual machines via network 120. Such multiple host computing devices and associated client computing devices 102 may be associated with the storage server 110. Illustratively, the client computing devices 102 associated with the storage server 110 can use virtual machines to access storage volumes via network 120. Accordingly, a storage volume can be provisioned for attachment to virtual machines as storage resource for a client computing device 102. In various embodiments, storage server 110 can reside at the edge of such a storage network in network 120 configured as a network control point for storage commands or requests.

Additionally, storage server 110 can relay resource requests from other servers in network topology 100. For example, storage server 110 can relay requests from VPN server 105 for data flows (e.g., real-time interactions) such as a remote viewing session implemented by Remote Desktop Protocol (RDP). Similarly, CDN server 115 can be configured to facilitate content requests in a content network in network 120. The CDN server 115 can be configured as a network control point for content requests or for relaying resource requests from other servers in network topology 100 such as VPN server 105 and storage server 110.

The CDN server 115 can communicate with the client computing devices 102 and content providers (not depicted in FIG. 1) via the network 120. The CDN server 115 may correspond to a logical association of one or more computing devices associated with a CDN service provider. Specifically, the CDN server 115 can include a number of point-of-presence ("POP") locations that correspond to nodes on the network 120. POPs can be geographically distributed throughout the network 120. In one embodiment, the network 120 represents a regional network for a particular geographical region (e.g., US West Coast). Additionally, one skilled in the relevant art will appreciate that the CDN server 115 can be associated with various additional computing resources, such additional computing devices for administration of content and resources, and the like.

The network 120 is operable to enable communication generally between the client layer 102 and the storage layer 113. The network 120 can also enable communication between various components of the network topology 100 such as communication between client computing devices 102, the VPN server 105, the storage server 110, and the content delivery network (CDN) server 115. The network 120 may be, for instance, a wide area network (WAN), a local area network (LAN), or a global communications network. Network 120 can enable communication between any components depicted in network topology 100. Network 120 can be the network of a data center, operated by a certain network provider. Or network 120 can be a public regional network, with aspects of network 120 being operated by different providers. For example, the CDN server 115 may be operated by a content delivery service provider.

As depicted, each server of network topology 100 can have a routing service associated with that server. Accordingly, VPN server 105 is associated with the routing service 107; the storage server 110 is associated with the routing service 112; and the CDN server 115 is associated with the routing service 117. Each routing service 107, 112, 117 may be operating solely on its respective server. In other embodiments, the routing service 107, 112, 117 may operate collectively communicating via network 120. The routing service 107, 112, 117 can utilize an API across a network topology with each server encapsulating API requests or API routing information at the API-level, while still operating with a communication protocol for routing of the API requests. For example, the routing service 107, 112, 117 can be configured to operate with a communication protocol having a set of rules regarding IP address assignment. Accordingly, the service 107, 112, 117 can interact with Network Address Translators ("NATs") based on the set of rules and the API routing information. In various embodiments, the Traversal Using Relays around NAT (TURN) protocol or Session Traversal Utilities for NAT (STUN) protocol can be the communication protocol used for the routing service 107, 112, 117. Such protocols can be used to interact with a NAT. For example, the STUN protocol can be used to by a server traverse a NAT: a server operating the STUN protocol can obtain public IP addresses and relay those addresses back to client devices operating as peers in network topology 100. Generally, any communication protocol that can associated addresses of client devices for public or private use can be used as a communication protocol for the routing service 107, 112, 117. Aspects of the routing service 107, 112, 117 interacting with the components of network topology, such as identification of a least cost route, will be described further below with reference to FIGS. 2-4.

As depicted in FIG. 1, each server of network topology 100 can have a back-end processing service associated with that server. Accordingly, VPN server 105 is associated with the back-end processing service 109; the storage server 110 is associated with back-end processing service 114; and the CDN server 115 is associated with the back-end processing service 119. Each back-end processing service 109, 114, 119 may be operating solely on its respective server. Or, in various embodiments, back-end processing service 109, 114, 119 may operate collectively communicating via network 120. The back-end processing service 109, 114, 119 can monitor performance metrics for various servers across the network topology, so that the routing service can use such metrics for analysis. Aspects of the back-end processing service 109, 114, 119 interacting with the routing service, such as analysis of API-level routing information, will be described further below with reference to FIGS. 2-4.

Illustratively, the routing service 107, 112, 117 or the back-end processing service 109, 114, 119 may include a number of hardware and software components. More specifically, the routing service 107, 112, 117 or the back-end processing service 109, 114, 119 may include hardware, software, configuration data, data structures, computer-readable code, or any type of information that can be loaded into memory and processed or published by the routing service 107, 112, 117 or the back-end processing service 109, 114, 119 respectively. Aspects of the routing service 107, 112, 117 will be described in further detail below with respect to FIG. 2-4 that illustrate the routing service 107, 112, 117, among other actions, analyzing identifying identifies routes for providing a resource request with the lowest latency, or more generally, the least cost for the routing service to provide the resource. In various embodiments, reference to the routing service 107, 112, 117 or the back-end processing service 109, 114, 119 within the present disclosure may include multiple computing devices working in conjunction to facilitate the identification of a least cost route. For example, multiple computing devices may be server computing devices operating in a data center environment configured for a particular customer of the data center. As depicted, the routing service 107, 112, 117 or the back-end processing service 109, 114, 119 can operate collectively on a VPN server 105, storage server 110, and a CDN server 115. As another example, in various embodiments, the routing service 107, 112, 117 may be distributed through a network as depicted in FIG. 1 across servers 105, 110, 115. Additionally or alternatively, it can be appreciated by one skilled in the art that the routing service 107, 112, 117 and back-end processing service 109, 114, 119 may correspond to a combination thereof and/or include any other services, be centralized in one computing device, and/or be distributed across several computing devices. As yet another example, the routing service 107, 112, 117 or the back-end processing service 109, 114, 119 can operate on any type of client computing device 102 implementing the routing service 107, 112, 117 or the back-end processing service 109, 114, 119, and operating as a server for routing data flows.

Figure 2:
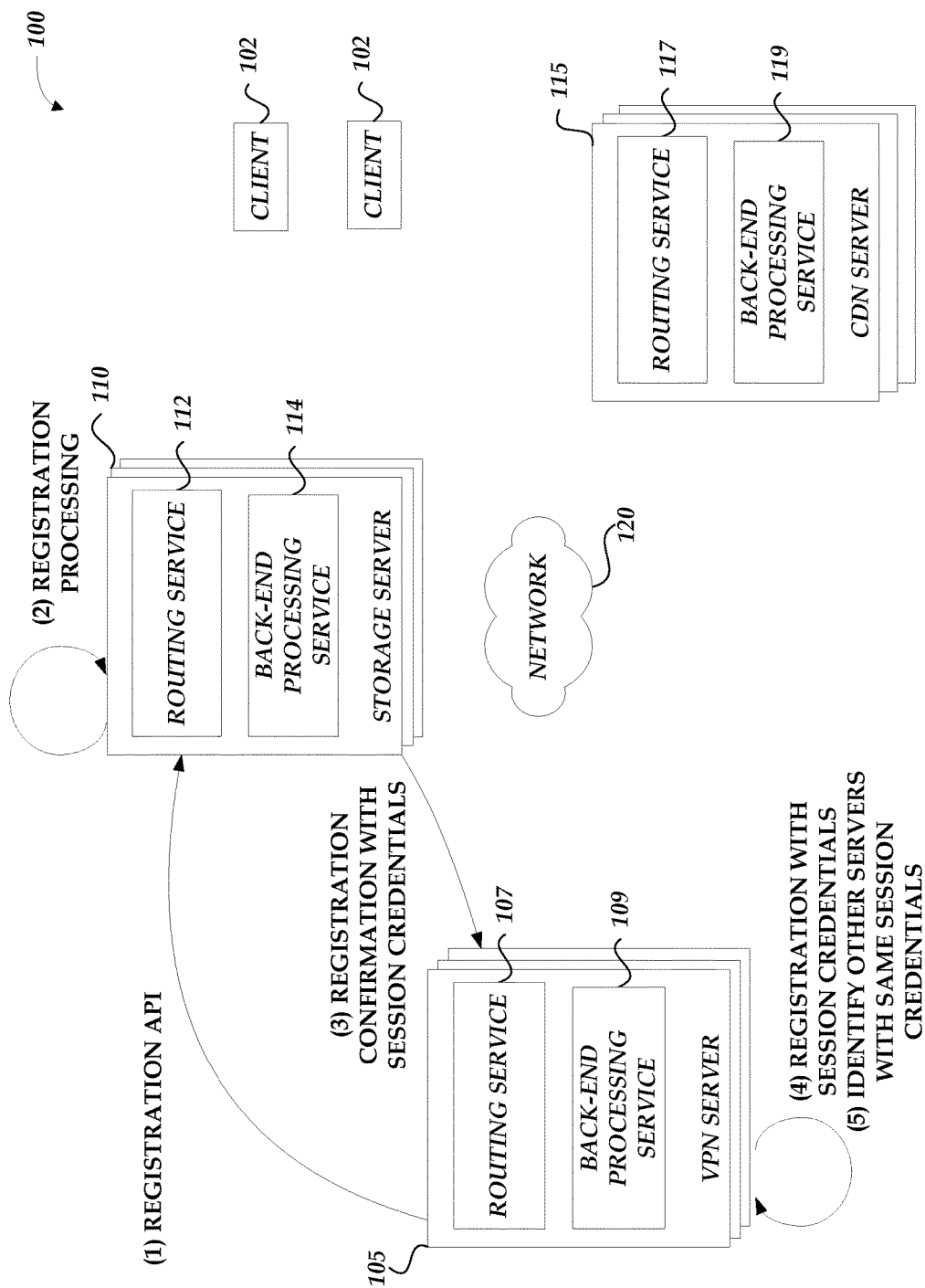
FIG. 2 is a block diagram of the network topology of FIG. 1 illustrating application-programming interface (API) registration.
Figure 3A:
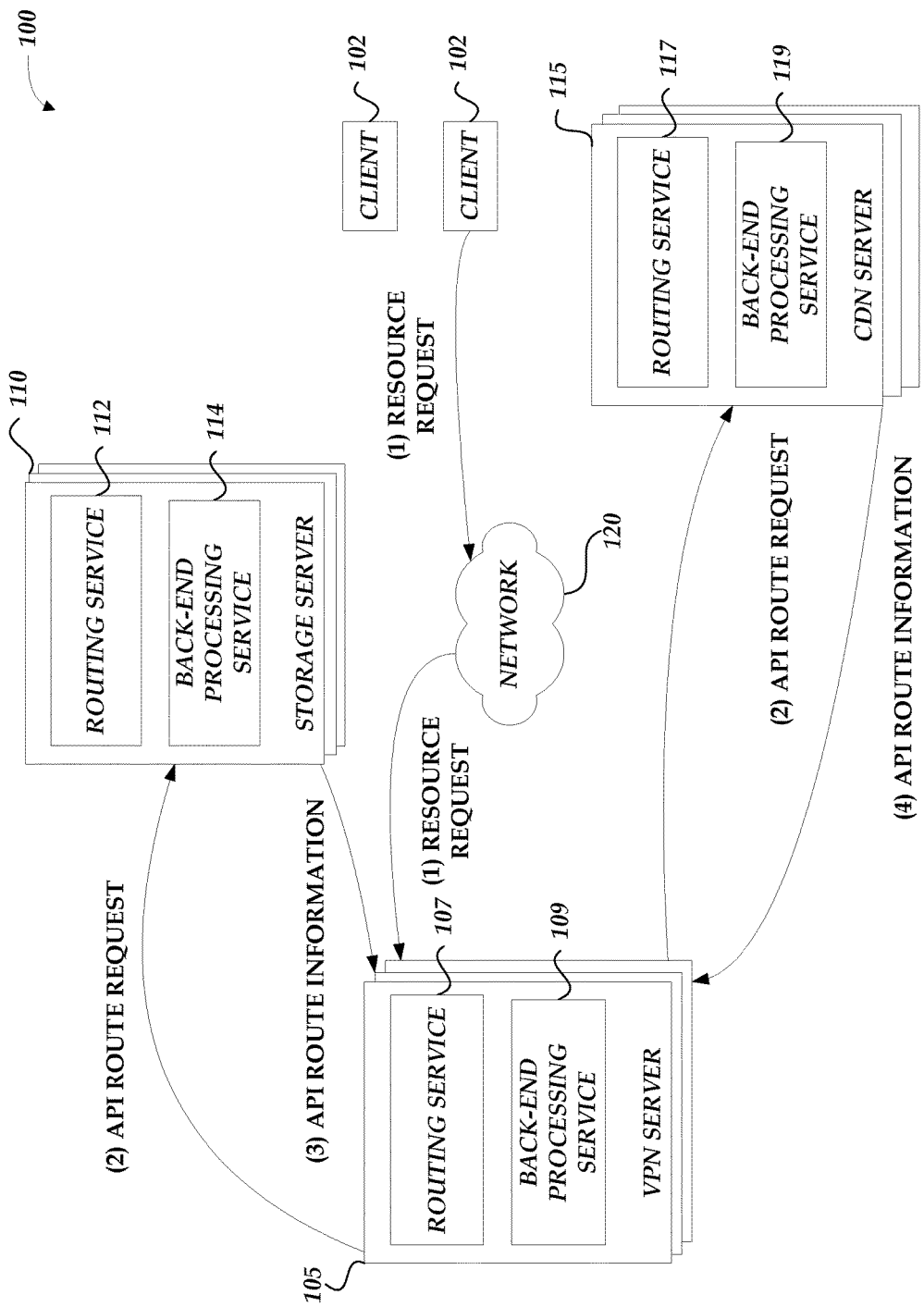
FIG. 3A is a block diagram of the network topology of FIG. 1 illustrating transmission of and processing of a resource request from a client computing device by one of the servers in the network topology.
Figure 3B:
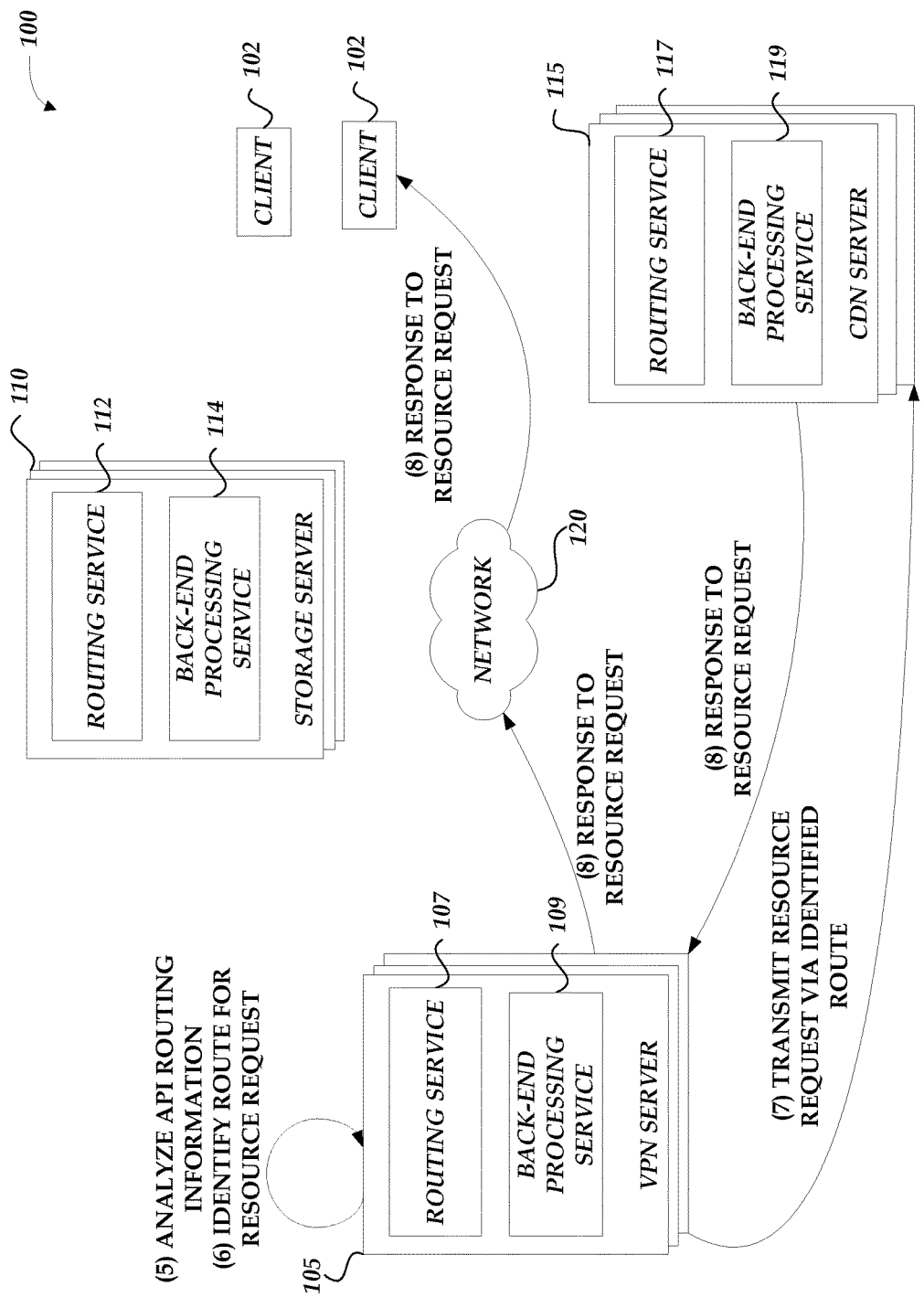
FIG. 3B is a block diagram the network topology of FIG. 1 illustrating identification of a route within the network topology and processing of a response to the resource request for the client computing device.
Figure 4:
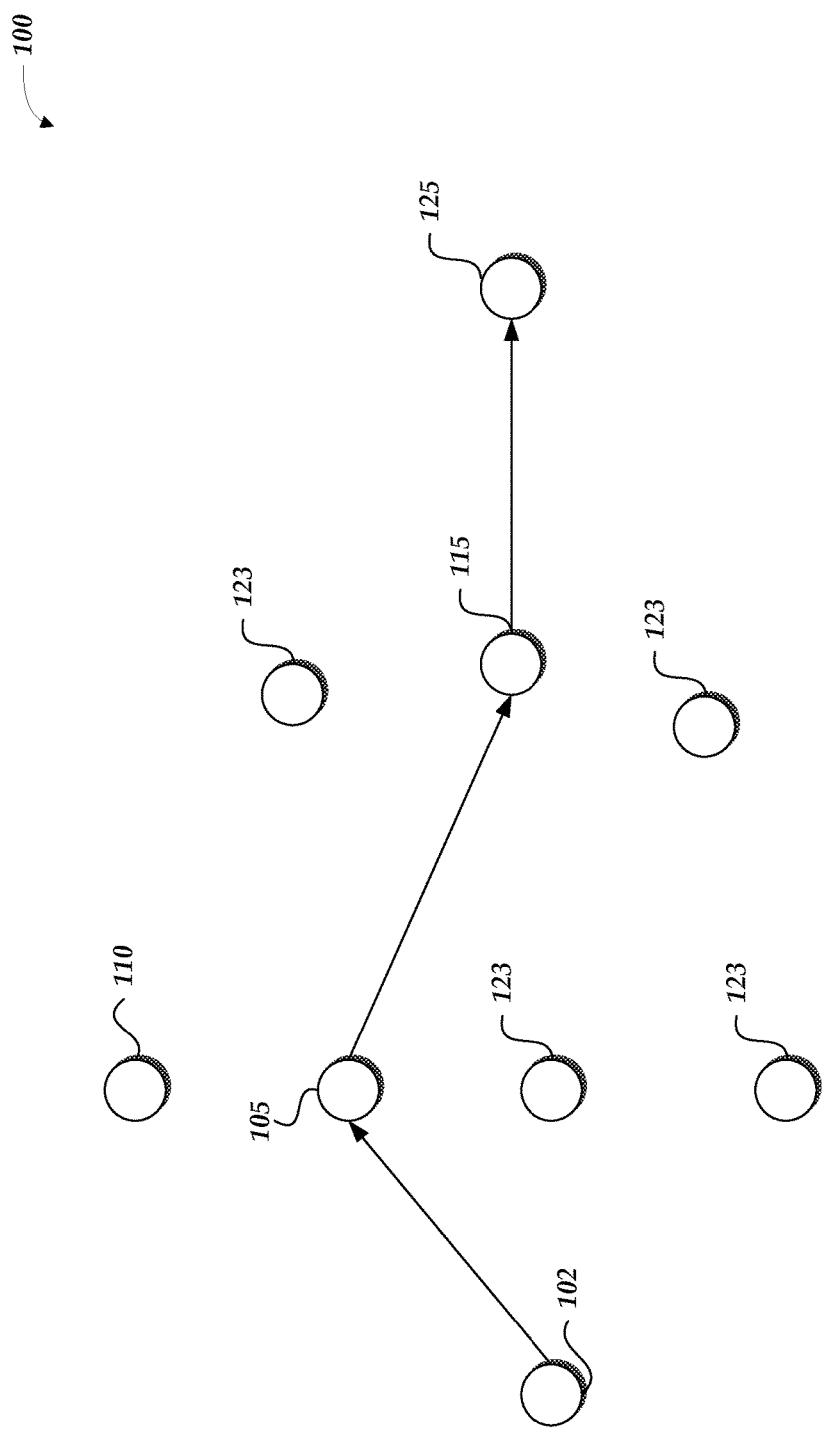
FIG. 4 is a block diagram the network topology of FIG. 1 illustrating routing of a resource request for on an identified route within the network topology.

With reference now to FIGS. 2-4, the interaction between various components of the network topology 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

FIG. 2 is a block diagram of the network topology of FIG. 1 illustrating application-programming interface (API) registration within the network topology of FIG. 1. As illustrated in FIG. 2, the API registration process for routing service 107, 112, 117 begins with registration of the VPN server 105 with the storage server 110. In an illustrative embodiment, the VPN server 105 utilizes a communication protocol supporting the routing service API to register with the storage server 110 such that the storage server 110 can provide access to storage resources (e.g., a storage volume) for a private client computing device 102 associated with the VPN server 105. For example, API registration may correspond to the initiation of a secure tunnel between a client computing device 102 associated with the VPN server 105 and a storage volume associated with the storage server 110. Continuing in this example, the registration API can include a public IP address and port number for storage services, both of which may be determined by the VPN server 105 for a particular client computing device 102.

One skilled in the relevant art will appreciate that upon identification of a public IP address and a port number, the storage server 110 can begin to direct or relay resource requests for resources from client computing devices 102 to the VPN server 105. Specifically, in accordance with rules of the routing service, a resource request from client computing device 102 would eventually be routed or relayed to the VPN server 105. Or, in an embodiment not depicted, a resource request may be routed to a POP associated with the CDN server 115

With continued reference to FIG. 2, upon receiving the registration API, the storage server 110 obtains and processes the registration information at (2). In the depicted embodiment at (3), the storage server 110 can then generate registration confirmation with session credentials. Once received at VPN server 105 at (4), VPN server 105 processes the registration with the session credentials. From one perspective, the processing of the session credential can be characterized as an API session startup between VPN server 105 and storage server 110. Such an approach allows the routing service 107 and the routing service 112 to interact at the API-level, such as by sending API-level requests, described further below with respect to FIG. 3A. Additionally, routing services 107, 112, 117, distributed across the various servers of network topology 100, interact at the API-level, such as by receiving API-level route requests, described further below with respect to FIG. 3A. Accordingly, the VPN server 105, the storage server 110, and the CDN server 115 can be associated with a common routing service 107, 112, 117, with the session credentials required for an interaction from the respective server, and which validates access to the routing service 107, 112, 117. Any one of the various routing services 107, 112, 117 can receive API-level requests, such as an API-level route request from VPN server 105. Similarly, the back-end processing service 109, 114, 119 can be viewed as a common back-end processing service 109, 114, 119, with the session credentials required for an interaction from the respective server, and which validates access to the back-end processing service 109, 114, 119.

In various embodiments, session credentials may include a session identifier allowing identification of API requests and routes with a particular session. A session identifier can indicate other servers registered with the same API. Accordingly at (5), using a session identifier, VPN server 105 can identify other servers with same session credentials. For example, the CDN server 115 can have the same session credentials, which can allow routing service 117 to interact with routing service 107 and routing service 112. One skilled in the relevant art will appreciate that various types of session credentials may be generated by the storage server 110 and that the session credentials may be embodied in any one of a variety of formats. For example, the session credentials can be included in metadata as specified by a communication protocol.

Routing service 107, 112, 117 can manage the session credentials at the API-level to determine and establish routes for providing requested resources on behalf of client computing devices 102. To accomplish this, session credentials can also include IP addresses and ports associated with applications of the various servers. Applications on the various servers can provide a specific service functionality for clients associated with that server. With the routing service 107, 112, 117 facilitating the provision of various resources across network topology 100, client computing devices 102 associated with a sever having a specific service functionality can also access other functionalities provided by applications operating on the other various servers of network topology 100. For example, an RDP application operating on a client 102 associated with VPN server 105 can be associated with a specific port for providing that RDP service. As another example, an HTTP application (e.g., a web browser) on a client 102 associate with CDN server 115 can be associated with a specific port for providing that HTTP service. In one embodiment, the HTTP port can correspond to port 80 as specified by the Transport Control Protocol (TCP). Various ports are available having different services. As non-limiting examples, other ports can be associated with Simple Mail Transport Protocol (SMTP) and File Transport Protocol (FTP). Generally, session credentials can include available sockets having an IP address and a port for any client computing device 102 in network 120. Accordingly, a server can transmit, at the API level, a resource request that includes a destination IP address and a port associated with the service or functionality of the resource request.

FIG. 3A is a block diagram of the network topology of FIG. 1 illustrating transmission of and processing of a resource request from a client computing device by one of the servers in the network topology. At (1), client computing device 102 transmits a resource request via network 120 to the VPN server 105. For example, client 102 can transmit a resource request through a browser operating on client 102. In this example, the resource request can be a request for a data flow of a video chat with a browser operating on a client associated with VPN server 105. In various embodiments, the resource request from a browser to another browser for data flows can be communicated via the Web Real Time Communications ("WebRTC") API protocol. That is, an API-level resource request can be transmitted corresponding to a WebRTC requests. As examples of WebRTC requests, RTCPeerConnection can initialize audio or video calls; and RTCDataChannel can allows browser to share real-time data. As one example of a RTCDataChannel request, a browser can request that another browser share the desktop or operating screen of the other browser. This can be accomplished using the port associated with Remote Desktop Protocol, in various embodiments. Additionally, resource requests may be transmitted on a different layer, for example, a data layer (e.g., a data plane) that may be routed by the routing service 107.

At (2), VPN server 105 transmits an API route request to both storage server 110 and the CDN server 115. Routing service 107 can then interact with routing service 112 and routing service 117. From one viewpoint, with this interaction between servers using API route requests, VPN server 105, storage server 110, and CDN server 115 can be viewed as network control points for managing routes in the network 120 for providing resources. For example, in one embodiment, a VPN server can transmit an API route request regarding a Remote Desktop Protocol (RDP) application to a client associated with a CDN server. The API route request can include a destination IP address of the client associated with the CDN server and the port associated with RDP. The routing service 107 can operate at a control layer (e.g., a control plane) to transmit route requests and identify least cost routes for resource requests operating at the data layer. The routing service 107 can operate the control layer for communicating the various interactions between the various servers of a network topology 100, as will be illustrated in this example with respect to interactions between the VPN server 105, the storage server 110, and the CDN server 115. Routing services 105, 112, 117 can use back-end processing services 109, 114, 119 to obtain routes for providing the requested resource.

Continuing in the depicted embodiment of FIG. 3A, the storage server 110 and the CDN server 115 can use the back-end processing service 114 and back-end processing server 119 respectively to process historical data to determine whether a particular route for the requested resource is a least cost route. As used herein, a least cost route is a route from the origin of a resource to the client. Along that least-cost route, various servers may process or relay the resource to the client. Accordingly, the least-cost route is a route that may optimize a network performance factor such as latency, packet loss, throughput, or any other relevant network performance factor. In one embodiment, the least cost route can be a historical route for resources of an application associated with the resource request. Both back-end processing service 114 and back-end processing server 119 may use various methods associated with least-squares optimization or generally optimization processing (e.g., solving a convex set of routes using convex optimization) processing to identify a least cost route for providing a resource request in network toplogy 100.

Both back-end processing service 114 and back-end processing server 119 can use various network performance metrics to calculate several routes available via storage server 110 and CDN sever 115 respectively for providing the requested resource. Storage server 110 can have an agent that collects metrics regarding resources relayed or processed at storage server 110. Back-end processing service 109 and back-end processing service 119 can also use the network performance metrics to calculate routes for VPN server 105 and CDN server 115 respectively. Similarly, agents on the respective VPN server 105 and CDN server 115 can obtain collected network performance metrics regarding resources relayed or processed at those servers respectively. In other embodiments not depicted, back-end processing service 109, 114, 119 can obtain metrics from data stores or any other network entity within network 120.

In various embodiments, network performance metrics can include throughput metrics, packet loss metrics, latency metrics, metadata associated with ports for specific service functionality, metadata related to destination IP addresses, or metadata indicative of API session credentials. Illustratively, a throughput metric, such as the number of requests completed per second, can indicate how efficient a server is at processing or relaying requests. Latency metrics can indicate processing or relaying time of the requested resource at a specific server. For example, a latency metric can indicate end-to-end processing of a request for API routing information, thereby indicating a latency in communication along that route. Or, as another example, a latency metric can indicate latencies of routes from various servers across the network topology. For example, a server can ping along a route to determine the latency of that route. Each server along that route can relay the time for transmission or relaying of that ping. For example, the various times along that route can be stored as time points or time information associated with that ping. Or as yet another example, latency can be determined from past processing times along that route.

In other embodiments, the back-end processing service 109, 114, 119 can process network performance metrics to calculate routes for providing a resource, without necessarily obtaining a resource request from a client computing device 102. That is, routes can be calculated for a resource proactively so that when a resource request is obtained, minimal processing may be required to process the network performance metrics. For example, in one embodiment, the back-end processing service 109, 114, 119 can provide the calculated routes to the routing service 107, 112, 115. Continuing in this example, devoid of a resource request, the routing service 102, 109, 112 can analyze the API routing information and identify a least cost route for an arbitrary resource proactively. Accordingly, when a resource is requested, the resource may be provided along the least cost route, with minimal processing from the back-end processing service 109, 114, 119 and the routing service 107, 112, 115.

Continuing in the depicted embodiment of FIG. 3A, at (3), the storage server 110 provides API routing information to the VPN server 105. Subsequently or simultaneously, at (4), the CDN server 115 provides API routing information to the VPN server 105. In both cases, API routing information can include calculated routes for providing the requested resource via the respective servers having transmitted the API routing information. In some cases, routes can overlap. That is, a route included within the API routing information from storage server 110 can include a node that passes through the CDN server 115. As will be illustrated in FIG. 4 below, various routes for providing the requested resource are possible that may relay through various servers of the network topology 100. The API routing information can also include relevant network performance metrics for a routing service to further analyze those metrics.

FIG. 3B is a block diagram the network topology of FIG. 1 illustrating identification of a route within the network topology and processing of a response to the resource request for the client computing device. At (5), with such API routing information available to the routing service 107, the routing service 107 can analyze the API routing information. In various embodiments, the routing service 107 can determine whether transient issues (e.g., an overload level or congestion level) exists at a particular server or between particular points in a route.

A network performance metric included within API routing information can be compared to a threshold to determine whether a certain network performance metric indicates a transient issue. In some embodiments, a trailing average can be computed from a network performance metric, only indicating a threshold breach if that trailing average is greater than (or less than, depending on the metric) the threshold. Such a threshold comparison can allow the routing service to be more efficient when determining whether transient issues exist. For example, a trailing average for packet loss on storage server 110 or CDN server 115, relative to the packet loss on all severs can be computed over a period of week by adding the $n^{th}$ value of packet loss, on Wednesday, to the sum total of all packet loss since Sunday; then, dividing by n (e.g., four, if n equals a packet loss metric received each day). That computed trailing average can indicate a transient issue, in contrast to the packet loss on Tuesday, which would not have breached the trailing average threshold. Accordingly, the trailing average threshold can indicate a transient issue where a network performance metric alone may not. Thus, the routing service 107 can use this trailing average threshold to determine whether an overload exists on a particular route (e.g., the historical route).

As another example of analyzing API routing information using a threshold, a threshold can correspond to an upper band and a lower band. The upper band and lower bands can be computed based on the performance of the storage server 110 or CDN server 115 generally, with the bands defining unusual or statistical outlier performance. A threshold breach is indicated when a network performance metric falls outside of those bands. In one embodiment, an outlier is identified because it does not meet (e.g., falls below) a performance threshold computed using various statistical processing techniques and the network performance metrics. In another embodiment, an operator of the storage system can define the threshold (e.g., a user-defined threshold) so that the operator is notified if a certain network performance metric breaches the threshold. As can be seen from this description, various thresholds can be employed to allow the routing service 107 to determine whether a transient issue exists on a route, allowing better identification or triangulation of transient issues. In some cases, analyzing API routing information and identifying a transient issue can make a system more efficient because it uses less processing time or processing power, resulting in a cost savings by hardware and/or power.

In some embodiments, the API routing information can indicate that the least cost route is a historical route for providing the requested resource. In which case, the historical route can be referred to as the requested route for the requested resource. The routing service 107 can also analyze the historical route to determine whether a transient issue exists along that route. For example, the routing service 107 can determine that the route between the VPN server 105 and a client associated with the VPN server has low throughput. This can indicate that the transient issue exists at the "last-mile" between the client and the VPN server 105. In other embodiments, a routing service such as routing service 107, 109, 112 can be implemented on a client computing device such as a set-top box. Viewed from this perspective, the client computing device can be as seen as a server in network topology 100 and operating as another network control point that can implement the routing service 102, 109, 112. As such, such a network control point, implemented on a client computing device, can also interact with the VPN server 105, the storage server 110, and the CDN server 115. Accordingly, a transient issue can be identified along a route specifically between the set-top box and another client computing device such as a smartphone interacting with the set-top box. For example, the transient issue can be that the wireless network connecting the set-top box to the smartphone has a certain congestion level or is down. For example, the routing service 102, 109, 112, when implemented on a client computing device, can determine that a wireless network using an Institute of Electrical and Electronics Engineers ("IEEE") 802.11 format (e.g., a Wi-Fi signal) is malfunctioning or is congested.

In the event that a transient issue does exist at the least cost route or another requested route, the routing service 107 can also determine alternative routes for providing the requested resource. For example, routing service 107 can determine that alternate servers exist to provide an alternate route for providing the requested resource. Illustratively, if a regional network includes the VPN server 105, the storage server 110, and the CDN server 115, an alternative server can be a server outside a regional network, but still within network topology 100. In one embodiment, the identified route may be a combination of alternative servers outside of the regional network and one or more servers within the regional network (e.g., storage server 110), with those one or more servers having the lowest packet loss in that regional network. To determine an alternative route, routing service 107 can compare metrics received in the API routing information to determine whether other routes are available meeting network performance criteria. In such a case, alternative routes may not be a least cost route but may optimize some other factor of network performance. In one embodiment, an alternative route can be the least cost route if the previous least cost route has been determined to be experiencing a transient issue.

Continuing with reference to FIG. 3B, at (6), the routing service 107 can operate at an API level on each server to identify routes in the network topology 100. Because routing service 107 can interact with the routing service 112 and the routing service 119, multiple routes can be identified within the network topology 100 to provide requested resources for any service functionality hosted in the network topology regardless of the service functionality hosted by a certain server. Additionally, requested resources can be routed or relayed through servers with varying service functionalities at the API level. Servers can use the routing service to dynamically route traffic on identified routes with the lowest latency to achieve a higher throughput for various requested resources. Accordingly, for any particular requested resource, a lowest latency route can be identified by the routing service 107. If no transient issue has been identified, the identified route can be a requested route or a historical route for providing the requested resource. In other cases, routing service 107 can use the analysis of the API routing information as described above to identify an alternative route for providing the requested resource.

At (7), based on the identified least cost route, the VPN server 105 transmits a request for the resource via the identified least cost route. As depicted, the routing service 107 has determined that the identified route is via the CDN server 115. The request for the resource can include header information indicating the network component to process the resource request. In some cases, this header information can correspond to the API routing information provided by CDN server 115 at (4), as describe above with reference to FIG. 4A. Accordingly, the routing information can indicate that the resource request may be processed or routed via CDN server 115. Additionally, the request for the resource via the identified least cost route may be transmitted on a different layer, for example, a data layer (e.g., a data plane) that may be routed by the routing service 107.

At (8), a target device associated with the CDN server 115 transmits the response to the resource request to the client 102 via the VPN server 105. In some embodiments, this can be viewed as a response to the resource request at step (1) by the client computing device 102. In various embodiments, the resource can be a resource allowing a data flow facilitated by the API session established with session credentials. For example, routing service 107 can facilitate a connection or secure tunnel from a client device associated with the VPN server 105. Additionally, the response to the resource request via may be transmitted on a different layer, for example, a data layer (e.g., a data plane) that may be routed by the routing service 107.

FIG. 4 is a block diagram the network topology of FIG. 1 illustrating routing of a resource request on an identified route within the network topology. As was illustrated in FIG. 3A-3B, routing service 107 determined that the least cost route for providing the resource request to a target device 125 was via the CDN server 115. As illustrated for a resource request such as a video conference, client computing device 102 can interact with the target device 125 via the route depicted along VPN server 105 and CDN server 115. In this example, client computing device 102 may be associated with the VPN server 105 on a private network (e.g., an enterprise network). Of note, this least cost route does not include the storage server 110. Various other routes are possible via alternate servers 123. However, as determined the least cost route is via the depicted route. The example illustrated in FIG. 4 is not intended to limit the processing of a resource request along the identified least cost route or a route via VPN server 105 and CDN server 115. As described above, alternate routes can be determined for varying scenarios of transient issues; or other routes may be determined to be the least cost route via an alternate server 123 or via storage server 110, for example.

As another example not depicted in FIG. 4, routing service 117 of CDN server 115 can determine that another route to provide the resource (e.g., a data flow of a video conference) is a least cost route, and not the least cost route to provide the resource request. For example, a real-time interaction during a video conference may require more bandwidth. Routing service 117 can use the API routing information to compare throughput metrics of the alternate servers 123 and the storage server 110. Continuing in this example, the routing service 117 can determine that the throughput metrics indicate a security concern in the regional network because a throughput performance metric of the storage server 110 does not meet a lower band threshold. For example, a DDoS attack can cause the throughput metrics of the storage server 110 to fall below a lower band threshold. Accordingly, the routing service 117 can determine that a route along one or more alternate servers 123 may be the least cost route to provide the resource to the client computing device 102 hosted on a private network of the VPN server 105.

Figure 5:
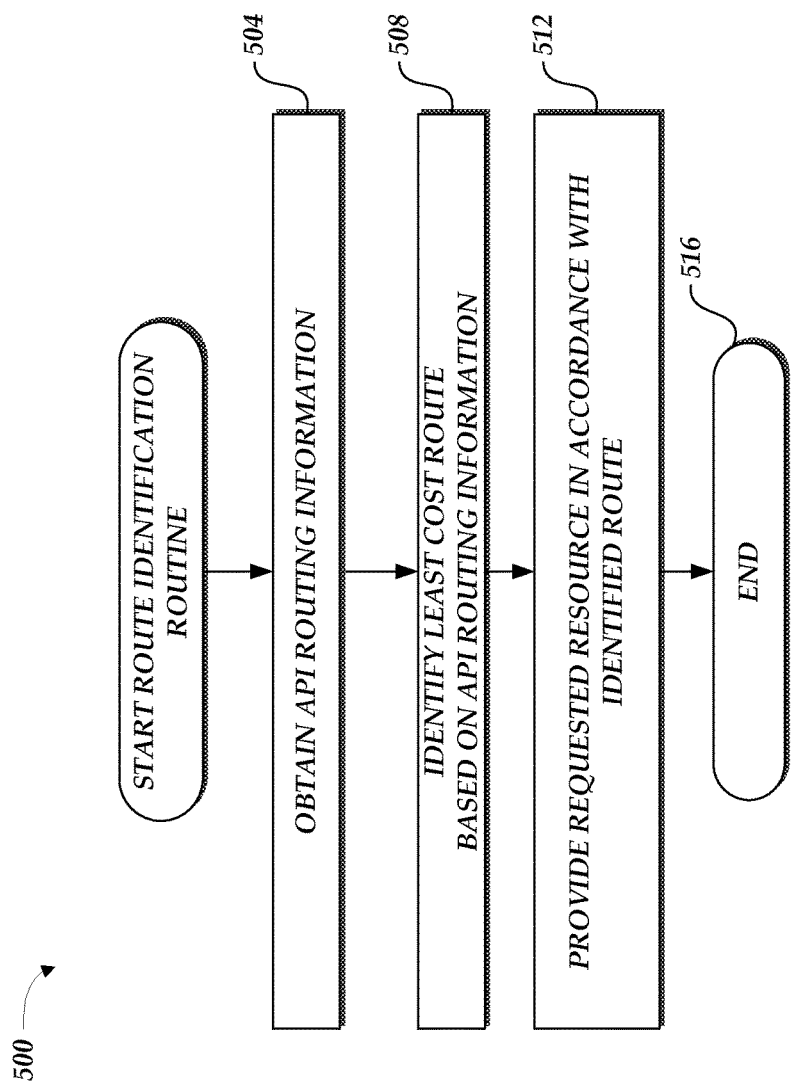
FIG. 5 is a flow diagram of an illustrative route identification routine implemented by a routing service.

FIG. 5 is a flow diagram of an illustrative route identification routine implemented by a routing service. The routing service can be a routing service as described with reference to the routing service 107, 112, 117 in network topology 100. Routine 500 begins at block 504 where API routing information is obtained by routing service 107, 112, 117. As described above, API routing information can include calculated routes for providing the requested resource and network performance metrics associated with various servers along the calculated routes. In various embodiments, the metrics can be packet loss or latency metrics for indicating transient issues as discussed above with reference to FIG. 3A. The API routing information can also be obtained asynchronously from each respective server in the network topology 100. Accordingly, the API routing information can be provided proactively to routing service 107 when a respective server obtains calculated routes for providing the requested resource. As an example, the VPN server 105 can provide the API routing information apart from any resource request by a client computing device 102.

Next at block 508, the routing service 107, 112, 117 identifies routes providing a resource request with least cost for the least for the routing service. Identifying a route to provide a resource request with least cost can be accomplished as discussed above with reference to FIG. 3B at (6). Continuing in the example of the asynchronous processing of API routing information, the routing service 107, 112, 117 may identify the least cost routes from obtained API routing information, even when a resource has not yet been requested by a client computing device 102. In that case, the resource can be provided on the identified least cost route, without further processing by the routing service 107, 112, 117 at block 512. As illustrated at block 512, the routing service 107, 112, 117 can provide the requested resource in accordance with the identified route, which can also be accomplished as discussed above with reference to FIG. 3B at (7) and (8). Thereafter, the routine 500 ends at block 522.

In various embodiments, routine 500 may be performed by independently by any of the routing services 107, 112, 117 of a storage system. In other embodiments, a physical computing device with computer-executable instructions may cause the computing device to perform routine 500. In some embodiments of the routine 500, elements may occur in sequences other than as described above. One skilled in the art will appreciate that additional variations are possible and within the scope of the present disclosure.

Figure 6:
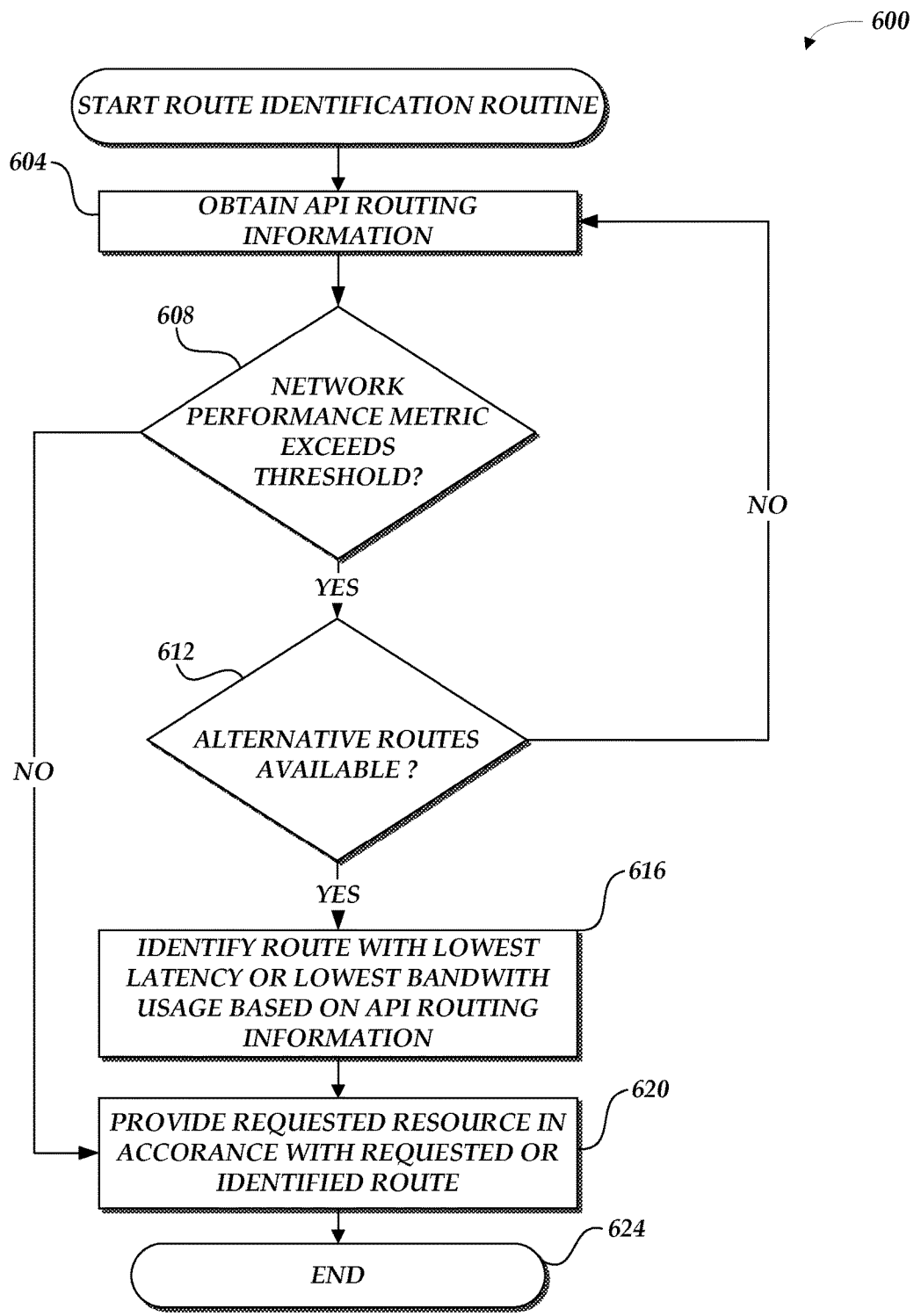
FIG. 6 is a flow diagram of an illustrative route identification routine implemented by a routing service.

FIG. 6 is a flow diagram of an illustrative route identification routine implemented by a routing service. The routing service can be a routing service as described with reference to the routing service 107, 112, 117 in network topology 100. Routine 600 begins at block 604. At block 604, where API routing information is obtained by routing service 107, 112, 117.

At decision block 608, the routing service 107, 112, 117 compares network performance metrics from the API routing information to determine whether a certain performance metric exceeds a performance threshold. Determining whether a transient issue exists can be determined as discussed above with reference to FIG. 3B at (5). If a network performance metric does not exceed a performance threshold, the flow proceeds to block 620. At block 620, the requested resource is provided in accordance with the requested route. For example, the requested route can be a historical route for providing the requested resource. Thereafter, the flow ends at block 624.

If however, at block 608, a network performance metric does exceed a performance threshold, which can indicate a congestion level or an overload level along the requested route, the flow proceeds to decision block 612. At decision block 612, the routing service 107, 112, 117 determines whether alternative routes are available. For example, the routing service 107, 112, 117 can use the network performance metrics to determine whether other routes are available on alternate servers. If not more than one alternate route is available, the flow proceeds back to block 604 where further API routing information can be obtained. For example, API routing information can be obtained from servers from outside a regional network. As another example, API routing information can be obtained from servers that have not been registered with API session credentials by first transmitting an API registration request to such servers. The routing service 107, 112, 117 can use this additional API routing information to again proceed in the flow of routine 600 and determine whether alternate routes are available at decision block 612.

If at least two alternate routes are available at decision block 612, the flow proceeds to block 616. At block 616, the routing service 107, 112, 117 identifies a route with lowest latency or lowest bandwidth usage based on the API routing information. For example, a route with lowest latency can be determined by comparing latency metrics of routes. As another example, a route with lowest bandwidth usage can be determined by comparing throughput metrics. Identifying the route with the lowest latency or lowest bandwidth usage can be seen as optimizing a network performance metric. Accordingly, the identified route can be referred to as the least cost route. In other embodiments, identifying the least cost route can be accomplished as discussed above with reference to FIG. 3B at (6).

After identifying the least cost route at block 616, the flow proceeds to block 620. At block 620, the requested resource is provided in accordance with identified route. In various embodiments, the requested resource can be provided in accordance with the identified route, as discussed above with reference to FIG. 3B at (7) and (8). Thereafter, the flow ends at block 624.

In various embodiments, routine 600 may be performed a routing service 107, 112, 117. In other embodiments, a physical computing device with computer-executable instructions may cause the computing device to perform routine 600. In some embodiments of the routine 600, elements may occur in sequences other than as described above. One skilled in the art will appreciate that additional variations are possible and within the scope of the present disclosure.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

All of the processes described herein may be embodied in, and fully automated via, software code modules executed by computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
    a first computing device comprising one or more processors configured with processor-executable instructions to perform operations requesting real-time communications with a second computing device; and
    a set of intermediate computing devices, wherein individual intermediate computing devices comprise one or more processors configured with processor-executable instructions comprising a data service and a routing control service, wherein each intermediate computing device is configured to execute the routing control service and an individual client service functionality different from the routing control service,
    wherein the data service is configured to:
        receive a resource request from the first computing device;
    wherein the routing control service is configured to:
        transmit application-programming interface level ("API-level") requests, as an originating intermediate computing device, to a first target intermediate computing device and a second target intermediate computing device, wherein the first and second target intermediate computing devices are selected from the set of intermediate computing devices;
        receive API-based routing information comprising a plurality of network performance metrics and a plurality of routes for providing the resource request from the first and second target intermediate computing devices;
        determine that at least one performance metric of the plurality of performance metrics does not meet a performance threshold for a route of the plurality of routes;
        determine that the at least one performance metric not meeting the performance threshold corresponds to a congestion level on the route;
        identify at least two routes of the plurality of routes that are available to provide the resource request; and
        identify a least latency route of the at least two routes; and
    wherein the data service is further configured to:
        transmit the resource request via the identified least latency route.

2. The system of claim 1, wherein the routing control service operating on the first target intermediate computing device is configured to:
    receive a first API-based request from the originating intermediate computing device;
    test a first latency metric of a first route, the first route configured to obtain the resource request on behalf of the client computing device; and
    generate a first API-based routing information including the first route and the first latency metric.

3. The system of claim 2, wherein the routing control service operating on the second target intermediate computing device is configured to:
    receive a second API-based request from the originating intermediate computing device;
    test a second latency metric of a second route, the second route configured to obtain the resource request on behalf of the client computing device; and
    generate a second API-based routing information including the second route and the second latency metric.

4. The system of claim 3, wherein identifying the least latency route of the at least two routes comprises comparing the first latency metric of the first route with the second latency metric of the second route.

5. A computer-implemented method for identifying a route for a resource request, the method comprising:
    transmitting, at an intermediate computing device, application-programming interface level ("API-level") requests to a first target intermediate computing device and a second target intermediate computing device, the API-based requests regarding an application of a resource configured for a data flow, wherein the intermediate computing device and the first and second target intermediate computing devices are each configured to execute a distributed routing control service and an individual client service functionality different from the distributed routing control service;
    receiving, by the intermediate computing device, API-based routing information from at least the first target intermediate and second target intermediate computing devices, the routing information comprising a plurality of routes for the application of the resource;
    identifying at least two routes of the plurality of routes that are available for the application of the resources; and
    processing, by the intermediate computing device, the routing information to identify a least cost route of the at least two routes for the application of the resource.

6. The computer-implemented method of claim 5, wherein processing the API-based routing information to identify the least cost route for the application of the resource comprises:

obtaining a plurality of network performance metrics from the API-based routing information, the plurality of performance metrics related to a performance of a resource on a historical route;

determining that a packet loss metric of the plurality of network performance metrics does not meet a packet loss threshold for the historical route; and determining that the application of the resource is to be transmitted on a least cost route, the least cost route being a historical route for the application.

7. The computer-implemented method of claim 5, wherein processing the API-based routing information to identify the least cost route for the application of the resource comprises:

obtaining a plurality of network performance metrics from the API-based routing information, the plurality of performance metrics related to a performance of a resource on a historical route;

determining that a latency metric of the plurality of network performance metrics exceeds a latency threshold for a historical route, wherein the latency threshold corresponds to an upper band of latency performance for providing a resource associated with the application;

determining that the latency metric exceeding the latency threshold corresponds to a system overload on the historical route;

comparing a plurality of latency metrics to identify at least two alternative routes to provide the application of the resource; and determining that one of the at least two alternative routes corresponds to the least cost route.

8. The computer-implemented method of claim 7, wherein the latency metric of the plurality of performance network metrics comprises time information related to a ping relayed across alternative intermediate servers, wherein the ping is relayed on one of the at least two alternative routes.

9. The computer-implemented method of claim 5, wherein transmitting the API-based requests to the first target intermediate computing device and a second target intermediate computing device comprises encapsulating the resource request in a routing protocol configured to interact with a network address translator ("NAT").

10. The computer-implemented method of claim 9, wherein the first target intermediate computing device is configured to provide a storage functionality for clients associated with the second server computing device.

11. The computer-implemented method of claim 10, wherein the second target intermediate computing device is configured to provide virtual private network ("VPN") functionality for clients associated with the third server computing device.

12. The computer-implemented method of claim 9, wherein transmitting the API-based requests to first target intermediate computing device and a second target intermediate computing devices further comprises:

transmitting API session registration information to the first target intermediate computing device and the second target intermediate computing device; and receiving API-based session confirmation from the first target intermediate computing device and a second target intermediate computing devices; and generating API-based session credentials.

13. The computer-implemented method of claim 12 further comprising:

identifying at least one additional target intermediate computing device with the API session credentials; and obtaining additional API-based routing information from the at least one additional target intermediate computing device.

14. The computer-implemented method of claim 9, wherein each of the API-based requests comprises data flow information for a port associated with an application and a network address for a client computing device.

15. The computer-implemented method of claim 14, wherein the port associated with an application corresponds to a port associated with at least one of Simple Mail Transport Protocol (SMTP), Hypertext Transport Protocol (HTTP), File Transport Protocol (FTP), Traversal Using Relays around NAT (TURN), Session Traversal Utilities for NAT (STUN), or Remote Desktop Protocol (RDP).

16. The computer-implemented method of claim 5, wherein the resource corresponds to at least one of data encapsulated in a TCP layer or datagrams encapsulated in UDP.

17. A non-transitory computer-readable storage medium including computer-executable instructions comprising:

computer-executable instructions that, when executed by a computing device associated with one or more client computing devices:

transmit an application-level request to a second computing device and a third computing device, the request associated with a destination and a port associated with an application of a resource, the application of the resource configured for a data flow, wherein the computing device and the second and third computing devices are each configured to execute a distributed routing control service and an individual client service functionality different from the distributed routing control service;

receive an application-level communication responsive to the application-level request, the application-level communication including routing information from at least the second computing device and the third computing device, the routing information comprising a plurality of routes for providing the resource;

identify at least two routes of the plurality of routes that are available for providing resource; and analyze the routing information to identify a least cost route of the at least two routes for providing the resource.

18. The non-transitory computer-readable storage medium of claim 17, wherein analyzing the routing information to identify the least cost route comprises:

obtaining a plurality of metrics from the routing information;

determining that an issue exists on a route for providing the resource based on the plurality of metrics; and comparing the plurality of metrics to identify the least cost route for providing the resource.

19. The non-transitory computer-readable storage medium of claim 17, wherein transmitting the request regarding the destination and the port comprises encapsulating the request in a protocol for associating addresses of client devices.

20. The non-transitory computer-readable storage medium of claim 19, wherein the protocol for associating addresses of client devices corresponds to a set of rules for interacting with a network address translator (NAT).

21. The non-transitory computer-readable storage medium of claim 20, wherein the set of rules for interacting with the NAT is specified by at least one of Traversal Using Relays around NAT (TURN) and Session Traversal Utilities for NAT (STUN).

22. The non-transitory computer-readable storage medium of claim 21, wherein the computing device corresponds to a VPN server, wherein the application-level request corresponds to at least one of a WebRTC session request or a Remote Desktop Protocol ("RDP") session request.

23. The non-transitory computer-readable storage medium of claim 17, wherein the resource corresponds to at least one of a RDP session, a video conference, or a voice conference.

24. The non-transitory computer-readable storage medium of claim 17 further configured to:
  receive additional routing information from a back-end processing service, wherein the additional routing information comprises a plurality of metrics and a plurality of routes;
  wherein analyzing the routing information to identify the least cost route further comprises:
    comparing at least one metric obtained from the additional routing information with a performance threshold.

* * * * *